Figure 1:
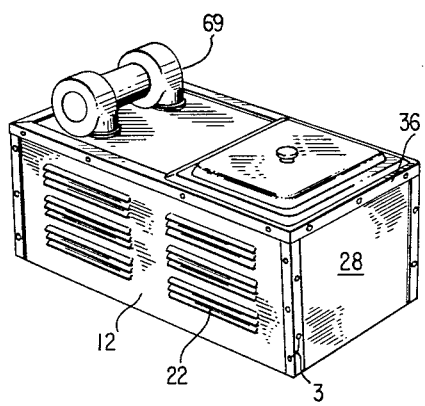

Oct. 27, 1964 T. L. JERNIGAN 3,153,919
MERCHANDISING FREEZER WITH CONDENSER COOLING MEANS
Filed Nov. 23, 1962 2 Sheets-Sheet 1

INVENTOR.
THOMAS L. JERNIGAN
BY
Browne, Schuyler and Beveridge
ATTORNEYS

Oct. 27, 1964　　　T. L. JERNIGAN　　　3,153,919
MERCHANDISING FREEZER WITH CONDENSER COOLING MEANS
Filed Nov. 23, 1962　　　2 Sheets-Sheet 2

INVENTOR.
THOMAS L. JERNIGAN
BY
Browne, Schuyler and Beveridge
ATTORNEYS

United States Patent Office 3,153,919
Patented Oct. 27, 1964

3,153,919
MERCHANDISING FREEZER WITH CONDENSER COOLING MEANS
Thomas L. Jernigan, Richmond, Va., assignor to Eskimo Pie Corporation, Richmond, Va., a corporation of Delaware
Filed Nov. 23, 1962, Ser. No. 239,634
4 Claims. (Cl. 62—453)

This invention relates to merchandising freezers, and more particularly to a merchandising freezer construction especially adapted for countertop merchandising of frozen confections such as those sold under the trademark "Eskimo Pie."

At the present time, the conventional retail merchandising practice in the sale of frozen confections such as ice cream bars in grocery stores, super markets, etc. involves the employment of a limited number of relatively large freezing cabinets, usually disposed at but a single location in the store. In the usual case, all of the wide variety of ice cream products marketed by a given store are available only at a single location with competitive products usually displayed closely adjacent one another. Preliminary tests have shown that the volume of sales of ice cream bars can be substantially increased by locating a relatively small ice cream bar cabinet at one or more locations within the store remote from the main ice cream cabinet. The present invention is directed to a relatively small freezer cabinet in the form of a self-contained unit of a size such that it can be readily located on a store countertop or other support at various locations within the store.

In the design of such a cabinet, several conflicting problems are encountered. The over-all external dimensions of the cabinet should be at a minimum, while at the same time the cabinet should be large enough to receive a substantial number of ice cream bars. Further, the cabinet should be a self-contained freezing unit incorporating its own refrigeration system. Because of the critical dimensioning problems, combined with the fact that such a cabinet is frequently opened during normal usage, the problem of frost in the freezing compartment becomes of substantial importance because the freezing compartment is usually designed to hold a certain number of bars and with the relatively small over-all dimension of the freezing compartment, a slight accumulation of frost on the interior of the compartment can substantially reduce the capacity of the compartment.

Accordingly, it is an object of the present invention to provide a self-contained merchandising freezer cabinet of relatively small over-all dimensions and having a relatively large internal freezer compartment.

Another object of the invention is to provide a merchandising freezer in accordance with the foregoing object wherein accumulation of frost on the interior of the compartment is prevented.

Still another object of the invention is to provide a merchandising freezer of the foregoing type wherein the defrosting operation is carried out in a manner such that it is unnecessary to provide for the drainage of water from the freezing compartment.

The foregoing, and other objects, are achieved in a merchandising freezer wherein both the condenser and evaporator of the refrigeration system are constructed in the form of plate-like members having internal refrigerant fluid passages either integrally formed in the plate-like member or in which tubing defining the respective coils is fixedly mounted upon a sheet member. The cabinet is in the general form of a rectangular parallelopiped and the plate embodying the condenser is constructed to define the longitudinal side walls and bottom of the cabinet. The evaporator plate, in turn defines the four vertical walls of the internally located freezing compartment. A bottom plate is fixedly secured to the evaporator plate, the evaporator being surrounded by a suitable insulating material. The longitudinal dimensions of the cabinet exterior substantially exceed the corresponding dimension of the evaporator plate assembly. The evaporator plate assembly is located adjacent one longitudinal end of the cabinet and the space thereby provided at the opposite longitudinal end is sufficient to define an enclosed compartment in which the refrigerating compressor and other elements of the refrigeration system may be enclosed.

The refrigeration system includes a normally closed valve operable when open to cause the system to supply refrigerant fluid in gaseous form to the evaporator coils to thereby heat the coils and perform the defrosting operation. The defrosting valve is controlled by a timing mechanism which is set to cyclically perform a defrosting operation at selected timed intervals. These intervals in turn are chosen to be of a length and frequency such that substantially no accumulation of frost occurs on the evaporator between successive defrosting operations. By cyclically defrosting at frequent intervals, the amount of frost which accumulates is so small that the heat supplied to the evaporator during the defrosting operation is not only sufficient to convert the frost into water, but further to completely vaporize all the frost accumulated.

Other objects and features of the invention will become apparent by reference to the following specification and to the drawings.

Figure 2:
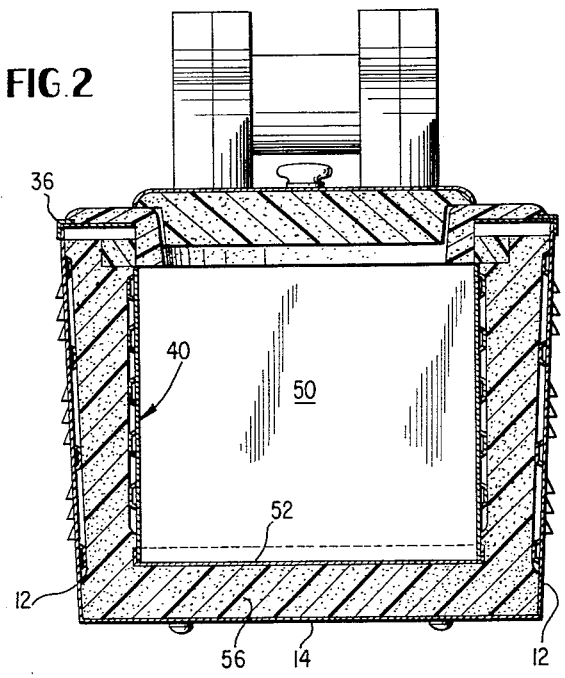
Figure 3:
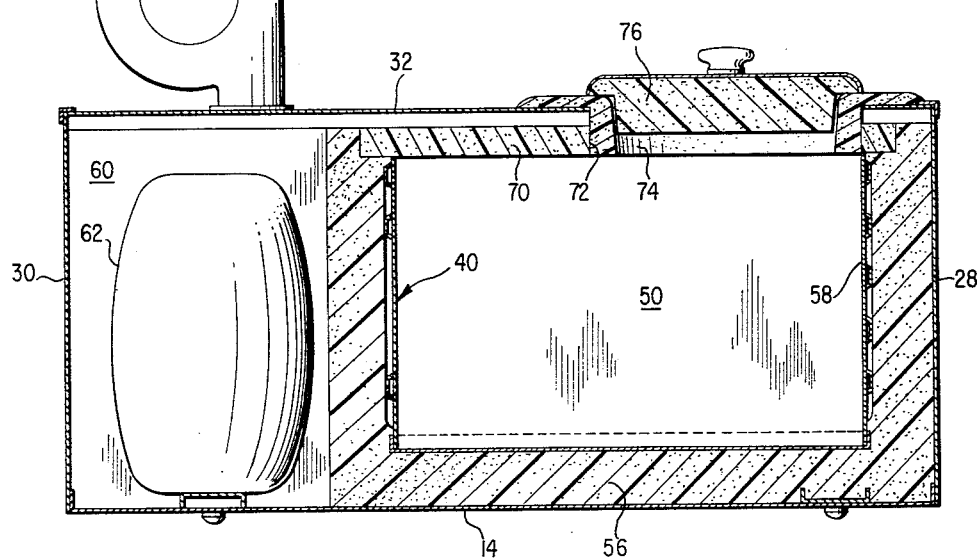
Figure 4:
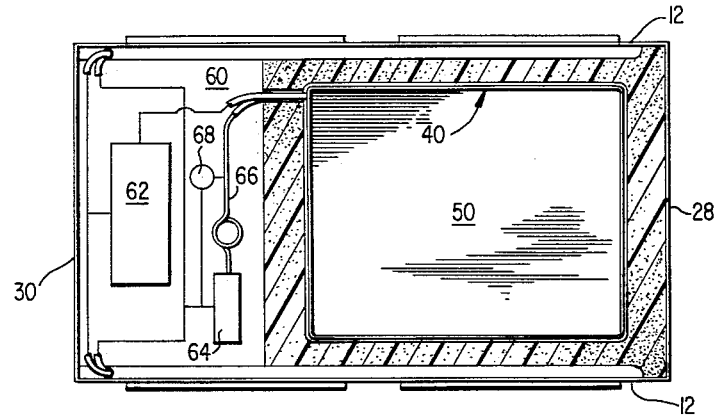
Figure 5:
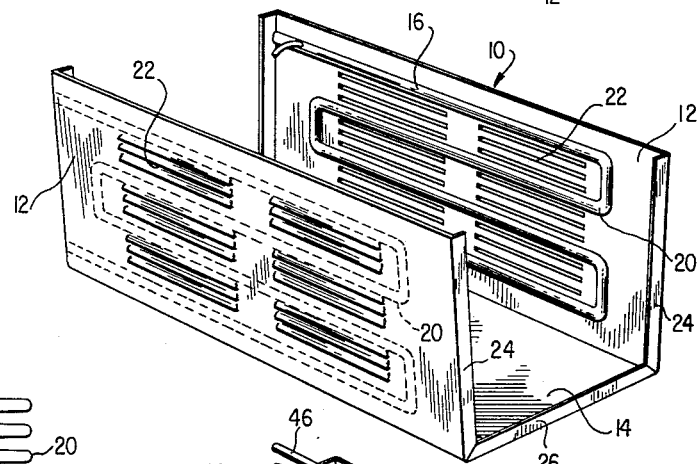
Figure 7:
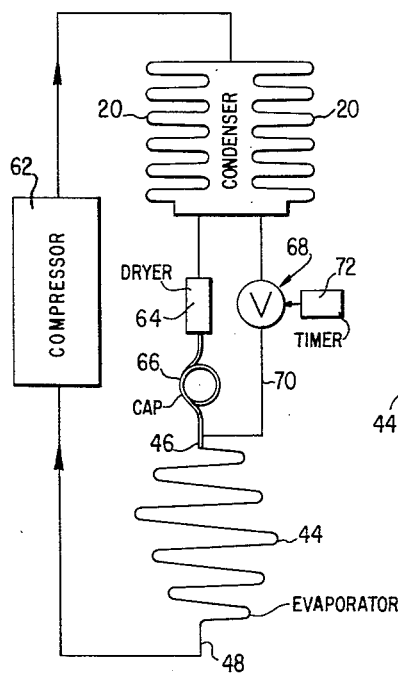
Figure 6:
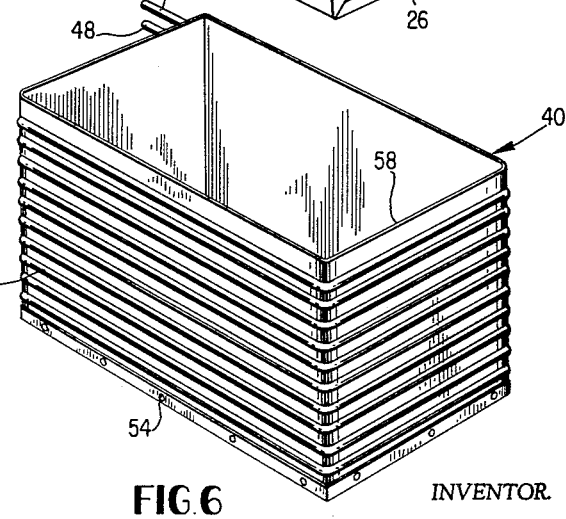

In the drawings:
FIG. 1 is a perspective view of a merchandising freezer embodying the invention;
FIG. 2 is a transverse cross-sectional view through the freezing compartment of the freezer of FIG. 1;
FIG. 3 is a longitudinal cross-sectional view taken in a vertical plane of the freezer of FIG. 1;
FIG. 4 is a longitudinal cross-sectional view taken in a horizontal plane of the freezer of FIG. 1;
FIG. 5 is a perspective view of the condenser plate of the freezer of FIG. 1;
FIG. 6 is a perspective view of the evaporator plate of the freezer of FIG. 1; and
FIG. 7 is a schematic diagram of the refrigeration system of the freezer of FIG. 1.

The freezer disclosed in the drawings finds its primary use in the retail merchandising of frozen confection such as ice cream bars such as those sold under the trademark "Eskimo Pie." The construction of the freezer may be best understood by first referring to FIG. 5 of the application drawings.

The structure of FIG. 5 is identified generally by the reference numeral 10 as the condenser plate assembly of the freezer although, as will become apparent, the condenser plate assembly also functions as the longitudinal side walls 12 and bottom wall 14 of the freezer. Each of side walls 12 is constructed with a condenser coil 20 which may take the form of a section of tubing fixedly mounted upon the side wall or formed with the side wall in a so-called "tube sheet" construction. One coil 20 is located on each side wall 12 and, as indicated in FIG. 7, the two condenser coils 20 are connected in parallel in the refrigeration circuit. To assist in the conduction of heat from coil 20, side walls 12 are formed with a plurality of louvers as at 22 to provide for increased circulation, louvers 22 being located between adjacent longitudinal runs of the respective coils. At each end of side walls 12 and bottom 14, inwardly projecting side and bottom flanges 24 and 26 respectively are formed to facilitate the mounting of end plates 28 and 30. A top cover plate 32 is provided also, end plates 28 and 30 and top plate 32 being fixedly secured to condenser plate assembly 10 as by bolts and corner trim strips 34 and 36 respectively.

Evaporator plate assembly 40 (FIG. 6) is formed with a single continuous internal passage or evaporator coil 44 which is connected at one end to an inlet tube 46 and at its opposite end to an outlet tube 48.

As best seen in FIG. 6, evaporator plate assembly 40 is formed to define the four vertical side walls of the internal freezer compartment 50, the bottom of compartment 50 being defined by a bottom plate 52 having vertical peripheral flanges secured to the respective side wall portions of evaporator plate assembly 40 as by bolts 54.

As best seen in the cross-sectional views of FIGS. 2, 3 and 4, the evaporator plate assembly 40 is spaced inwardly from the bottom and side walls of condenser plate assembly 10, the evaporator plate assembly being entirely surrounded by a suitable layer of heat insulating material 56. As best seen in FIGS. 3 and 4, evaporator plate assembly 40 is substantially smaller in its longitudinal dimension than is condenser plate assembly 10 and is located with one end wall 58 adjacent end wall 28 of the freezer. The opposite end wall 30 of the freezer is thus spaced from freezer plate 40 by a sufficient distance so that a mechanism compartment 60 is formed at the left-hand end of the freezer as viewed in FIGS. 3 and 4. Various elements of the refrigeration system such as the compressor 62, dryer 64 and capillary tube 66, together with a timer controlled solenoid actuated valve 68 are suitably mounted within compartment 60. The various connections to condenser coils 20 and evaporator coil 50 are made within compartment 60.

As best seen in FIGS. 2 and 3, the top of freezer compartment 50 is partially closed by a sheet of insulating material 70 formed with an access opening 72 within which a collar-like member 74 of insulating material is disposed. A cover 76 is employed to normally close the opening defined by collar 74.

The freezer described above is exceedingly compact in construction and, in fact, is preferably constructed of a size such that the freezer may be placed upon the top of a store counter at a location accessible to customers. In this environment, the freezing compartment is frequently opened and as a result, the evaporator plate is frequently exposed to normal room temperature and this in turn is conducive to the formation of frost on evaporator plate assembly 40. To keep the refrigeration system operating at peak efficiency, an automatic defrosting device which includes a normally closed timer actuated solenoid valve 68 has been connected in the normal refrigerating system as illustrated in FIG. 7.

In the normal or cooling cycle, the refrigerant fluid is circulated continuously around the circuit illustrated in FIG. 7 by the compressor. The direction of flow is as indicated by the arrows. The compressor discharges the refrigerant fluid in the form of a hot gas under pressure which then passes through the two parallel condenser coils 20, and, in passing through the coils becomes cooled. During the normal cooling cycle, solenoid valve 68 is closed and hence flow of refrigerant fluid from the condenser coils takes place through dryer 64 and capillary tube 66 from which the gas expands and liquifies as it passes through evaporator 44, and thence to the intake side of compressor 62. A blower 69 is mounted on the cabinet to induce a flow of air about condenser coils 20 and compressor 62, the air flow passing into mechanism and out of the cabinet through louvers 22. Blower 69 may, if desired, be concealed by a display rack mounted on the top of the freezer.

Solenoid valve 68 is connected in a bypass conduit 70 which bypasses dryer 64 and capillary tube 66 to thereby, when valve 68 is opened, conduct the refrigerant fluid in gaseous form to the evaporator. The resistance of conduit 70 and valve 68, when open, is substantially less than that of dryer 64 and capillary tube 66, hence when valve 68 is open substantially all of the refrigerant fluid leaving condenser coils 20 passes through bypass conduit 70 directly into the evaporator. This action heats the evaporator coils.

Valve 68 is controlled by a suitable timer mechanism 72 which is set to open valve 68 for one minute out of each hour of operation. Experience with this particular cabinet has shown that by periodically defrosting the cabinet for one minute out of each hour of operation the accumulation of frost is no only prevented, but further that the defrosting operation does not result in the accumulation of any water in the bottom of the compartment. By defrosting in the foregoing manner, the amount of frost which accumulates between successive defrosting operations is so small that at the conclusion of the defrosting operation, all of the frost has been converted into vapor. In practice, it has been found that the amount of frost which accumulates in the particular freezer compartment over the period of one hour is so slight as to be substantially undetectable. In the conventional aluminum evaporator plate assembly, about the only way in which the accumulation of frost is observable is a slight change in parent shade of the evaporator plate which can be observed for a short period of time at the beginning of a defrosting operation.

The prevention of the accumulation of frost is of extreme importance in a merchandising freezer of this type since the internal dimensions of freezer compartment 50 are selected so that the cabinet will hold a given number of standard sized ice cream bars. When these are packed neatly in the freezer, little or no space is available, and the accumulation of even a slight amount of frost on two opposed side walls would be sufficient to reduce the freezer capacity by one complete row of bars. Because this particular freezer is frequently opened during normal course of use, the frequent exposure of the evaporator coil to the warmer outside air is conducive to a rapid accumulation of frost.

While I have disclosed one embodiment of my invention, it will be apparent to those skilled in the art that the disclosed embodiment may be modified. Therefore, the foregoing description is to be considered exemplary rather than limiting and the true scope of the invention is that defined in the following claims.

What is claimed is:

1. In a merchandising freezer having a freezing compartment subjected to frequent opening during normal use, a compressor-condenser-capillary tube-evaporator refrigeration system having its evaporator disposed in heat exchanging relationship with said compartment to cool said compartment upon the circulation of refrigerant fluid through said system during normal operation of said system; the improvement wherein said freezer comprises a rectangular box-like casing, said condenser comprising a condenser plate member defining the exterior bottom and opposed longitudinal side walls of said casing, means on each of the longitudinal side wall portions of said condenser plate member defining refrigerant fluid passages, said evaporator comprising a vertically disposed evaporator plate member defining the opposed vertical interior side and end walls of said freezing compartment, means defining refrigerant fluid passages in said evaporator plate member, the opposed side wall portions of said evaporator plate member being respectively spaced inwardly from the adjacent side wall portions of said condenser plate member, one end wall portion of said evaporator plate member being located adjacent one end of said casing and the other end wall portion of said evaporator plate member being located intermediate the ends of said casing, heat insulating means surrounding the exterior of said evaporator plate member, said condenser plate member projecting longitudinally beyond said other end wall portion of said evaporator plate member and said insulating means, a top wall element and an end wall element cooperating with the projecting portions of said condenser plate member to define an enclosed compartment adjacent said one end of said casing adapted to receive said compressor, the outer surfaces of said insulating means and the inner surfaces of said opposed condenser plate sidewalls being separated to form channels extending lengthwise of said sidewall portions, said sidewall portions establishing one face of said channels being pierced by spaced openings, and a blower discharging air into said channels to flow therethrough and exit through said openings.

2. In the merchandising freezer as described in claim 1, said blower discharging into said enclosed compartment and said channels connecting at one end to said compartment, whereby the air from said blower cools both said compressor and said condenser.

3. In the merchandising freezer as described in claim 2, said channels extending a substantial distance from the bottom to the top of said sidewall portions and said openings being spaced vertically apart and are located near both the bottom and the top of said channels.

4. In the merchandising freezer described in claim 3, said condenser means fluid passages being arranged in multiple loops extending lengthwise of said channels, and said openings being arranged as a plurality of horizontally extending slots spaced vertically within each said loop.

References Cited in the file of this patent
UNITED STATES PATENTS

| | | |
|---|---|---|
| 2,464,606 | Philipp | Mar. 15, 1949 |
| 2,483,439 | Schweller | Oct. 4, 1949 |
| 2,654,231 | Eichhorn | Oct. 6, 1953 |
| 2,659,213 | Hart | Nov. 17, 1953 |
| 2,667,763 | Harris | Feb. 2, 1954 |
| 2,923,135 | Proetle | Feb. 2, 1960 |
| 2,959,939 | Arzberger | Nov. 15, 1960 |
| 3,001,378 | Stutrud | Sept. 26, 1961 |